US012050472B2

(12) United States Patent
Geitz et al.

(10) Patent No.: US 12,050,472 B2
(45) Date of Patent: Jul. 30, 2024

(54) CONTROLLING AN AUTONOMOUS VEHICLE VIA A RADIO ACCESS NETWORK

(71) Applicant: Deutsche Telekom AG, Bonn (DE)

(72) Inventors: Marc Geitz, Hagen (DE); Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 36 days.

(21) Appl. No.: 17/512,729

(22) Filed: Oct. 28, 2021

(65) Prior Publication Data
US 2022/0137640 A1  May 5, 2022

(30) Foreign Application Priority Data

Oct. 30, 2020 (EP) ..................................... 20204961

(51) Int. Cl.
*G05D 1/00* (2024.01)
*B60W 60/00* (2020.01)
(Continued)

(52) U.S. Cl.
CPC ......... *G05D 1/0282* (2013.01); *B60W 60/001* (2020.02); *H04W 72/046* (2013.01); *H04W 72/543* (2023.01); *B60W 2300/15* (2013.01)

(58) Field of Classification Search
CPC ......... G05D 1/0282; G05D 2201/0201; G05D 2201/0205; G05D 2201/0213;
(Continued)

(56) References Cited

U.S. PATENT DOCUMENTS 11,290,923 B2 *  3/2022  Akdeniz ........... H04W 36/0016
2015/0197010 A1  7/2015  Ruuspakka et al.
(Continued)

FOREIGN PATENT DOCUMENTS

KR  20200095469 A  8/2020
WO  WO-2015193853 A1 * 12/2015  ............. G06Q 10/04

OTHER PUBLICATIONS

Cunzhuo Zhao, et al., "Mobile Edge Computing Meets mmWave Communications: Joint Beamforming and Resource Allocation for System Delay Minimization", IEEE Transactions on Wireless Communications, Apr. 2020, pp. 2382-2396, vol. 19, No. 4, IEEE, Piscataway, New Jersey, USA (Year: 2020).*

*Primary Examiner* — Rami Khatib
*Assistant Examiner* — Shahira Baajour
(74) *Attorney, Agent, or Firm* — LEYDIG, VOIT & MAYER,LTD.

(57) ABSTRACT

A method for controlling an autonomous vehicle includes: controlling, by a stationary control unit connected to a radio access network, an autonomous vehicle via a wireless connection of the autonomous vehicle to the radio access network, wherein the autonomous vehicle moves in a predefined path network; allocating, by the radio access network, spectral resources to the wireless connection while the autonomous vehicle is moving; and determining, by the stationary control unit, a path of the autonomous vehicle in the predefined path network depending on the spectral resources used by the wireless connection of the autonomous vehicle while moving along the determined path.

12 Claims, 4 Drawing Sheets

(51) Int. Cl.
*H04W 72/044* (2023.01)
*H04W 72/543* (2023.01)

(58) Field of Classification Search
CPC ......... G05D 1/0274; G05D 2201/0216; G05D 1/0217; G05D 1/0022; B60W 60/001; B60W 2300/15; H04W 72/046; H04W 72/543
See application file for complete search history.

(56) References Cited

U.S. PATENT DOCUMENTS

| | | |
|---|---|---|
| 2015/0268052 A1* | 9/2015 | Berczi .................. G01C 21/343 701/408 |
| 2019/0164418 A1 | 5/2019 | Neukart et al. |
| 2020/0097022 A1 | 3/2020 | Miki et al. |
| 2020/0128591 A1 | 4/2020 | Subramanian |
| 2020/0252838 A1 | 8/2020 | Akdeniz et al. |
| 2020/0351666 A1* | 11/2020 | Mohen Venkatakrishnan ............. H04W 16/10 |

* cited by examiner

CONTROLLING AN AUTONOMOUS VEHICLE VIA A RADIO ACCESS NETWORK

CROSS-REFERENCE TO PRIOR APPLICATIONS

This application claims benefit to European Patent Application No. EP 20 204 961.5, filed on Oct. 30, 2020, which is hereby incorporated by reference herein.

FIELD

The invention relates to a method for controlling an autonomous vehicle, wherein a stationary control unit being connected to a radio access network controls an autonomous vehicle via a wireless connection of the autonomous vehicle to the radio access network, and the autonomous vehicle moves in a predefined path network and the radio access network allocates spectral resources to the wireless connection while the autonomous vehicle is moving. Furthermore, the invention relates to a control unit for controlling an autonomous vehicle and a computer program product.

BACKGROUND

Autonomous vehicles are configured for automatically moving along a path, i.e. a route, without being driven by a human driver. An autonomous vehicle may be understood to be any mobile unit regardless of a medium the path extends in. Accordingly, the autonomous vehicle may move on a flat solid underground, on rails, on or in a water body or in the air. The path may be defined by a predefined path network of a vehicle operation site.

The autonomous vehicle may be configured to freely determine the path to move along wherein the path extends from a starting point, e.g. an actual position of the autonomous vehicle, to a target point, i.e. a specified destination at a distance from the actual position of the autonomous vehicle. Additionally or alternatively, the path of the vehicle may be determined by a stationary control unit.

The stationary control unit may be connected to a radio access network which may be wirelessly connected to by the autonomous vehicle. Thus, the stationary control unit may readily control the autonomous vehicle, particularly a movement of the autonomous vehicle, via the wireless connection of the autonomous vehicle to the radio access network. In many practical cases, the radio access network is configured as a mobile communication network. While the vehicle is moving the radio access network allocates spectral resources, e.g. resource blocks defined by the 4G mobile telecommunication standard, to the wireless connection of the vehicle in order to provide a radio quality, i.e. a quality of service (QoS), sufficient for reliably controlling the autonomous vehicle along the path.

US 2020/0128591 A1 discloses a method for allocating radio resources to vehicle-to-infrastructure (V2I) communications.

KR 2020 0095469 A discloses a method for communicating parameters of a radio cell of a radio access network between a plurality of vehicles entering the radio cell from a previous radio cell.

US 2019/0164418 A1 discloses a method for maximizing a traffic flow of a plurality of vehicles. The method uses quantum annealing for optimizing future positions of the vehicles.

US 2020/0097022 A1 discloses a method for estimating optimum routes for a plurality of vehicles wherein a time-series route candidate of a shortest route and a time-series route candidate of a detour route are calculated for each vehicle.

US 2015/0197010 A1 discloses a method for selecting a path of an autonomous vehicle depending on a radio signal quality along the path.

Autonomous vehicles are increasingly used on industrial sites as vehicle operation sites. An industrial site may comprise a plurality of stations, e.g. pick-up stations, drop-off stations, machining stations, packing stations and the like, being arranged within an area at a distance from each other. The arrangement of the stations defines a path network comprising a plurality of intersections, possibly a plurality of endpoints, and a plurality of path sections, i.e. sections of a path, wherein each path section connects two intersections or an endpoint and an intersection. The stations and endpoints may be starting points and/or a target points of a path in the path network wherein the path comprises one or more successive path sections. Mathematically speaking the path network is a graph comprising a plurality of knots and edges wherein the intersections and endpoints correspond to the knots of the graph and the path sections correspond to the edges of the graph.

The industrial site may comprise a radio access network which is preferably configured as a so-called campus network, i.e. a private section of a public mobile communication network, covering the area of the industrial site. The campus network is exclusively used by the autonomous vehicles and further devices of the industrial site and being arranged on the industrial site.

The autonomous vehicles moving on the industrial site are used for automatically transporting parts or goods from one station/endpoint to another station/endpoint. Thereby, each autonomous vehicle is usually controlled by a stationary control unit of the industrial site according to an overall transport schedule, the control unit being connected to the radio access network. The autonomous vehicles moving on the industrial site, therefore, are often referred to as automated guided vehicles (AGV). For preventing the autonomous vehicles from colliding, the control unit ensures each intersection, each endpoint and each path section of the path network to be used by a single autonomous vehicle at most, i.e. not to be shared by two or more autonomous vehicles.

However, a spectral capacity of the radio access network, i.e. a maximum amount of spectral resources to be allocated by the radio access network, and local weaknesses of a radio performance, i.e. radio field strength, of the radio access network along a path of an autonomous vehicle limit the number of autonomous vehicles to be simultaneously and reliably controlled by the control unit.

SUMMARY

In an exemplary embodiment, the present invention provides a method for controlling an autonomous vehicle. The method includes: controlling, by a stationary control unit connected to a radio access network, an autonomous vehicle via a wireless connection of the autonomous vehicle to the radio access network, wherein the autonomous vehicle moves in a predefined path network; allocating, by the radio access network, spectral resources to the wireless connection while the autonomous vehicle is moving; and determining, by the stationary control unit, a path of the autonomous vehicle in the predefined path network depending on the spectral resources used by the wireless connection of the autonomous vehicle while moving along the determined path.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1a schematically shows a vehicle operation site comprising a control unit according to the invention;

FIG. 1b schematically shows a two-dimensional spatial distribution of local radio performance of the radio access network over the vehicle operation site shown in FIG. 1a;

FIG. 2 schematically shows a plurality of alternative paths on the vehicle operation site shown in FIG. 1a;

FIG. 3 schematically shows two waypoints defining two alternative paths on the vehicle operation site shown in FIG. 1a;

FIG. 4 schematically shows a plurality of radio performance values of the radio access network on the vehicle operation site shown in FIG. 1a.

DETAILED DESCRIPTION

Figure 1:
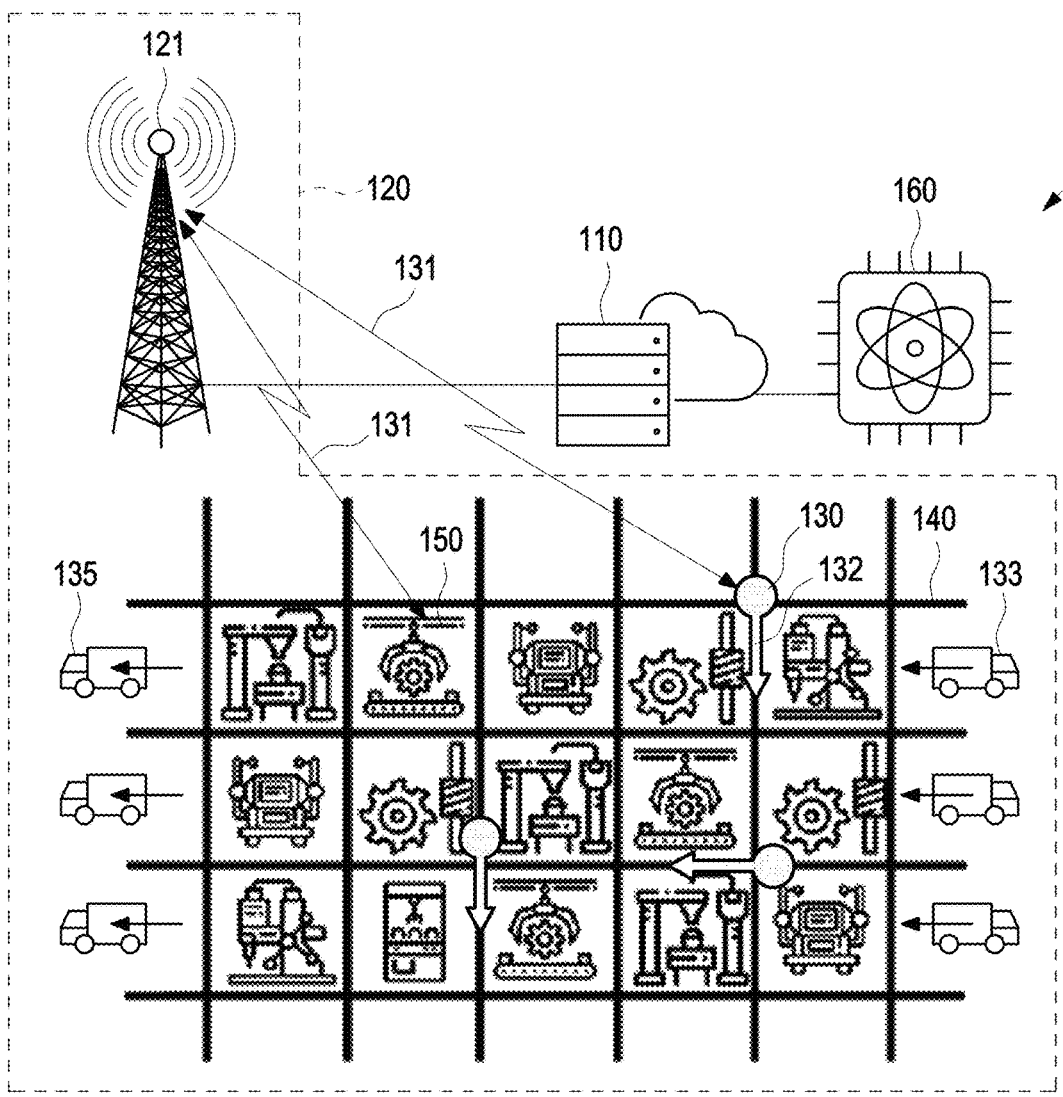
Figure 1:
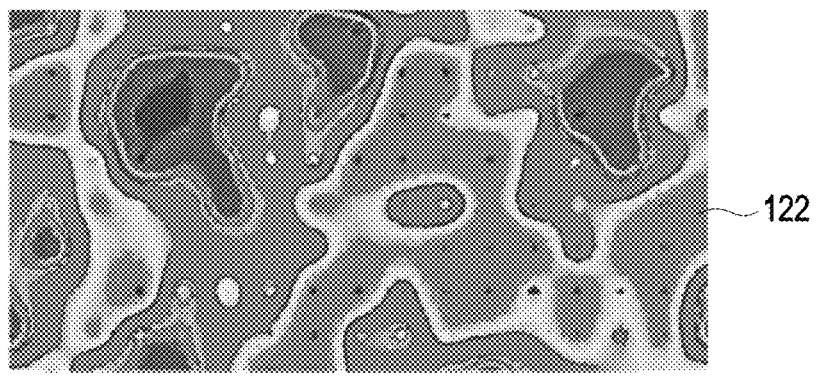

Exemplary embodiments of the invention provide a method for controlling an autonomous vehicle via a radio access network which allows for an efficient use of spectral resources of the radio access network. Exemplary embodiments of the invention further provide a control unit for controlling an autonomous vehicle and a computer program product.

A first aspect of the invention is a method for controlling an autonomous vehicle, wherein a stationary control unit being connected to a radio access network controls an autonomous vehicle via a wireless connection of the autonomous vehicle to the radio access network; the autonomous vehicle moves in a predefined path network; and the radio access network allocates spectral resources to the wireless connection while the autonomous vehicle is moving. The control unit controls a movement of the autonomous vehicle in the predefined path network. The autonomous vehicle may exemplarily be an automated guided vehicle (AGV) of an industrial site. The predefined path network may be a public road network, a network of airways, a network of waterways, a network of corridors in a building, particularly in an industrial hall, and the like. The path network comprises a plurality of intersections, possibly a plurality of endpoints, and a plurality of path sections. Each path section connects two intersections or an endpoint and an intersection. Each intersection or endpoint may be connected to by a plurality of path sections. The autonomous vehicle does not leave the path sections of the path network while it is moving therein.

According to the invention the control unit determines a path of the autonomous vehicle in the predefined path network depending on the spectral resources used by the wireless connection of the autonomous vehicle while moving along the determined path. The determined path depends on local radio performance of the radio access network, i.e. the control unit differentiates a path benefiting from a high local radio performance along at least a path section and a path suffering from a low local radio performance along at least a path section when determining the path of the autonomous vehicle. It is pointed out that this differentiation of paths is very different from a differentiation based on a path length or a moving time along the path.

Preferably, determining the path comprises minimizing an amount of used spectral resources. In other words, the control unit determines a path for the autonomous vehicle allowing the radio access network to allocate a minimum amount of spectral resources to the wireless connection of the autonomous vehicle to the radio access network along the path of the autonomous vehicle.

In many embodiments, an adiabatic quantum annealer or a quantum inspired annealer minimizes a target function indicating the amount of used spectral resources upon request of the control unit. Minimizing the target function utilizes M*N qbits wherein N is the number of autonomous vehicles and M is the number of alternative paths in the path network which are evaluated for each autonomous vehicle. In contrast, the size, i.e. a complexity, of the minimization problem is given as MN. In other words, the number of qbits increases linearly with the number of autonomous vehicles while the problem size increases exponentially with the number of autonomous vehicles. As a run time of a classical problem solver is proportional to the problem size, the classical run time for solving the minimization problem also increases exponentially with the number of autonomous vehicles.

Accordingly, classical problem solvers are only adequate for small minimization problems comprising about 10 paths and up to 10 autonomous vehicles which can be solved within 0.1 s. A problem comprising 10 paths and 15 autonomous vehicles, however, already causes a run time exceeding 2.5 h which is by far not compatible with a near-time control. In contrast, the number of qbits only increases from 100 to 150 without causing the annealer to use a longer run time. As a consequence, having the minimization problem solved by the annealer allows for a larger number of autonomous vehicles to be controlled.

The control unit may send a target function, i.e. a function to be minimized, to the annealer. The control unit and/or the annealer is preferably arranged at an edge of the radio access network wherein the edge is close to the path of the autonomous vehicle. In other words, the control unit and/or the annealer may be comprised by an edge cloud infrastructure connected to or part of the radio access network. Arranging the control unit and/or the annealer close to the path of the autonomous vehicle avoids a round trip time of the radio access network and allows for a small latency of the wireless connection and, hence, a real-time control or at least a very near-time control.

In advantageous embodiments, minimizing the amount of used spectral resources comprises determining a plurality of alternative paths for the autonomous vehicle and selecting the path with the minimal amount of used spectral resources from the determined alternative paths. The alternative paths have identical starting points and target points, respectively. Focusing on a set of alternative paths, i.e. candidate paths, significantly reduces the size of the minimization problem as compared with taking into account every possible path.

Each path may be determined by defining a waypoint to be visited by the autonomous vehicle when moving on the path. The defined waypoint defines a set of possible paths and, thus, reduces the size of the minimization problem.

Apart from that, different waypoints result in different sets of possible paths. For determining a path comprising the waypoint the Dijkstra algorithm may be used. The Dijkstra algorithm yields the respective shortest routes in the predefined path network from the defined waypoint both to the starting point of the path and to the target point of the path.

In these embodiments, the waypoint may be defined randomly. Randomizing is an efficient way of defining a plurality of different waypoints which ensures a corresponding plurality of different alternative paths. Particularly, the waypoints may be randomly defined at equal distances from the starting point or from the target point of the path.

In another embodiment, the control unit controls at least one device being different from the autonomous vehicle via a wireless connection of the device to the radio access network, the radio access network allocates spectral resources to the wireless connection of the at least one device, and the path of the autonomous vehicle is determined by minimizing an amount of the spectral resources depending on the spectral resources used by the wireless connections of both the vehicle while moving along the determined path and the at least one device. The at least one device may comprise a stationary device, e.g. a machining center, a conveyor belt, a sensor, particularly a camera, and the like, or a mobile device, e.g. an augmented reality (AR) glass, a virtual reality (VR) glass, an exoskeleton and the like, e.g. used by an employee working on or servicing the industrial site. The at least one device also uses spectral resources of the radio access network which the radio access network has to allocate within the spectral capacity, particularly for providing a radio performance required by the at least one device.

The radio access network may allocate spectral resources depending on local radio performance of the radio access network along the path and the control unit may assign a corresponding radio performance value to each section of the path. The control unit maps the local radio performance to a radio performance value. The radio performance value along a path section is averaged and assigned to the path section. The local radio performance must, of course, be known and may be detected and transmitted to the control unit by the autonomous vehicle moving along the path or by stationary sensors being arranged on the vehicle operation area.

In a preferred embodiment, a chronological order of the sections of the path is taken into account by deploying a plurality of time slices. Each time slice is a time interval from a starting time to an ending time. The plurality of time slices follow each other. The time slices allow for taking into account that an autonomous vehicle passes the path sections of a path subsequently and only moves on a single path section at any time. Accordingly, deploying the time slices allows for introducing a time dependency into the minimization problem, i.e. for a time-dependent target function. A time dependency of the used spectral resources may, on the one hand, result from the moving autonomous vehicle using varying spectral resources along the path. On the other hand, the time dependency of the used spectral resources may result from the at least one device which moves and/or uses varying spectral resources while operating, e.g. being alternately switched on an off.

A section of a subsequent path of the autonomous vehicle may be taken into account at a time slice when the autonomous vehicle has arrived at a target point of the path before the last time slice. Alternative paths may comprise a different number of path sections and/or path sections of different lengths and, hence, the autonomous vehicle may require different numbers of time slices for passing the alternative paths. A shorter alternative path may be prolonged by one or more sections of a subsequent path of the autonomous vehicle wherein the subsequent path is associated with a subsequent job of the autonomous vehicle. Thus, an efficiency of the automated vehicle is increased.

Advantageously, a minimum data rate for uplink and downlink, respectively, and/or a maximum latency for uplink and downlink, respectively, and/or a predefined combination of a minimum data rate and a maximum latency for uplink and downlink, respectively, is assigned to the wireless connection as a parameter of a service quality required by the autonomous vehicle. Assigning a minimum data rate to the wireless connection prevents the wireless connection from being too narrow while assigning a maximum latency to the wireless connection prevents the wireless connection from being too delayed with respect to the requirements of the autonomous vehicle for a safe operation. A specification of a radio communication protocol may define a plurality of predetermined combinations of minimum data rate values and maximum latency values. The predetermined combinations may cover a range from a practical non-availability to an ideal availability of a data rate and/or latency and may prefer either the data rate or the latency between the non-availability and the ideal availability. A predetermined configuration may also be referred to as an operating mode of the autonomous vehicle or the radio access network.

Particularly, an industrial truck, an industrial robot, a transport vehicle of a harbor, a railway station or an airport, an agricultural machine, a drone or a car is controlled as the autonomous vehicle. The autonomous vehicle may transport goods, parts, luggage or human passengers and may move on different vehicle operation sites. Accordingly, the inventive method may be applied to a large number of cases involving an autonomous vehicle.

It is preferred that the control unit controls a plurality of autonomous vehicles and determines a path for each autonomous vehicle depending on the spectral resources used by the wireless connections of all autonomous vehicles while moving along their respective paths. The inventive method particularly proves useful for controlling a plurality of autonomous vehicles and possibly a plurality of devices being different from the autonomous vehicles.

A minimum of a target function for N autonomous vehicles and M path sections may be written as a minimum of a Lagrange function $$\min\left(\sum_{l}^{L} w_l^2 \left(\sum_{i}^{N} \sum_{j}^{M} x_{ij} \beta_{j,l}\right)^2 + \lambda \sum_{i}^{N} \left(\sum_{j}^{M} x_{ij} - 1\right)^2\right)$$

wherein the Lagrange function is a sum of the term $$\sum_{l}^{L} w_l^2 \left(\sum_{i}^{N} \sum_{j}^{M} x_{ij} \beta_{j,l}\right)^2$$

being a cost function reflecting the allocated spectral resources, and a term $$\sum_{i}^{N} \left(\sum_{j}^{M} x_{ij} - 1\right)^2$$

being an equality constraint requiring each autonomous vehicle moving on exactly one path. λ is a so-called Lagrange multiplier.

In the above formulas L is a total number of path sections of the path network, l is an index of a path section $e_l$ of the path network and $w_l$ is the radio performance value assigned to the path section indexed l. Note that the cost function comprises $w_l$ squared in order to very much favor path sections with an assigned small radio performance value, i.e. a strong radio performance, as compared to path sections with an assigned large radio performance value, i.e. a weak radio performance.

Furthermore, $x_{ij}$ is a binary variable with $0<=x_{ij}<=1$ wherein $x_{ij}$ is 1 if an autonomous vehicle indexed i moves on a path p indexed j and $x_{ij}$ is 0 if the autonomous vehicle indexed i does not move on the path p indexed j. Thereby, the path $p_j$ is selected from a set of paths $P_i$, the set of paths $P_i$ being also referred to as a path box of the autonomous vehicle indexed i, and is calculated classically as set forth above.

Each path $p_j$ comprises one or more than one path section $e_l$. The symbol $β_{j,l}$ is defined to be 1 if the path $p_j$ comprises the path section $e_l$ and to be 0 if the path $p_j$ does not comprise the path section $e_l$.

It is noted that the Lagrange function may be easily formulated in the quadratic unconstrained binary optimization (QUBO) form which may be readily used by an adiabatic quantum annealer or a quantum inspired annealer.

While the above-mentioned Lagrange function is stationary, i.e. does not depend on time, a time dependency may be introduced into the Lagrange function by defining a set t of T time slices $$t=\{t_0, t_1, t_2, \ldots, t_T\},$$

wherein the $t_i$ are equally spaced points in time each pair $t_i$, $t_{i+1}$ defining a time slice $[t_i, t_{i+1}[$. With this definition a time-dependent Lagrange function may read $$\min\left(\sum_l^L w_l^2 \left(\sum_k^T \sum_i^N \sum_j^M x_{ij} β_{j,l} γ_{ilk}\right)^2 + λ \sum_i^N \left(\sum_j^M x_{ij} - 1\right)^2\right),$$

wherein the symbol $γ_{ilk}$ is defined to be 1 if an autonomous vehicle indexed i moves on a path section e indexed l in a time slice $[t_k, t_{k+1}[$ and 0 if the autonomous vehicle indexed i does not move on the path section e indexed l in the time slice $[t_k, t_{k+1}[$.

Additionally, a radio performance of the radio access network varying over time due devices being different from the autonomous vehicles may be introduced into the time-dependent Lagrange function by rendering the radio performance values wi time-dependent which yields $$\min\left(\sum_l^L \left(\sum_k^T w_l(t_k)^2 \sum_i^N \sum_j^M x_{ij} β_{j,l} γ_{ilk}\right)^2 + λ \sum_i^N \left(\sum_j^M x_{ij} - 1\right)^2\right),$$

wherein $w_l(t_k)^2$ is the radio performance value assigned to the path section ei averaged over the time slice $[t_k, t_{k+1}[$.

The time dependent Lagrange functions are also formulated in the quadratic unconstrained binary optimization (QUBO) form being adequate to an adiabatic quantum annealer or a quantum inspired annealer. It is noted that a complexity of the minimization problem is not increased due to the introduced time dependency as the sum over k of the cost function collapses due to the binary symbol γ.

A second aspect of the invention is a control unit for operating a plurality of autonomous vehicles. The control unit may be stationary and arranged close to a predefined path network of a vehicle operation site, e.g. an industrial site, comprising a radio access network and a plurality of autonomous vehicles.

According to the invention the control unit is configured for carrying out a method according to the invention. The inventive control unit allows for an efficient use of spectral resources of the radio access network and, thus, enables a safe operation of an autonomous vehicle moving along a path with a varying radio performance of the radio access network.

A third aspect of the invention is a computer program product, comprising a computer readable storage medium storing a program code, the program code being executable by a control unit for a plurality of autonomous vehicles. The storage medium may be a DVD, a USB stick, a memory chip, a hard disk, a cloud storage and the like being connectable to and accessible by the control unit.

According to the invention the program code causes the control unit to carry out a method according to the invention when being executed by a processor of the control unit. In other words, an existing control unit may be upgraded to a control unit according to an exemplary embodiment via a computer program product according to an exemplary embodiment.

According to an exemplary embodiment, a spectral capacity of a radio access network, particularly a campus network, is efficiently used allowing a safe operation for a possibly large number of autonomous vehicles and particularly a possibly large number of devices being different from the autonomous vehicles when the autonomous vehicles and particularly the devices being different therefrom are controlled via the radio access network.

Another advantage is that a vehicle operation site with autonomous vehicles and particularly devices being different from the autonomous vehicles may be simulated in order to determine a spatial distribution of a radio performance of a radio access network which is adequate for the vehicle operation site, i.e. optimally fits, i.e. falls below or exceeds, the local radio performance requirements. The spatial distribution determined by simulating allows for planning and constructing a physical radio access network for the vehicle operation site.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail via exemplary embodiments and with reference to the drawings.

FIG. 1a schematically shows a vehicle operation site 100 comprising a control unit 110 according to the invention. The vehicle operation site 100 further comprises a radio access network 120 which is configured as a campus network, i.e. a private section of a public mobile communication network. The radio access network 120 comprises an access node 121, e.g. a base station. The control unit 110 is connected to the radio access network 120, particularly to the access node 121 of the radio access network 120. The control unit 110 further is connected to an annealer 160.

The annealer 160 is configured as an adiabatic quantum annealer and may be alternatively configured as a quantum inspired classical annealer. The control unit 110 or the annealer 160 may be part of an edge cloud infrastructure being connected to the radio access network 120 and being arranged close to the access node 121 and the vehicle operation site 100. The annealer 160 may be part of the vehicle operation site 100.

The vehicle operation site 100 further comprises and defines a path network 140 and a plurality of autonomous vehicles 130. Exemplarily, only three of them are illustrated as circles. Each autonomous vehicle 130 is connected to the radio access network 120, particularly to the access node 121 of the radio access network 120, via a wireless connection 131. Each autonomous vehicle 130 is movable along a path 132 within the path network 140.

The autonomous vehicles 130 may be configured as industrial trucks, industrial robots, transport vehicles of a harbor, a railway station or an airport, agricultural machines, drones or cars. Correspondingly the vehicle operation site 100 may be an industrial site, a harbor, a railway station, an airport, an agricultural field or a public road network, respectively.

The industrial site may also comprise a plurality of devices 150 being different from the autonomous vehicles 130. Each device 150 is connected to the radio access network 120, particularly to the access node 121 of the radio access network 120, via a wireless connection 131. The devices 150 are arranged within the path network 140 and may be configured as stations comprising stationary devices like machining centers or as mobile devices like augmented reality (AR) glasses.

Further, the vehicle operation site may comprise a plurality of starting points 133 and target points 135 for the autonomous vehicles 130. The starting points 133 and the target points 135 are illustrated as three trucks to be unloaded and to be loaded, respectively, without limiting the scope of the invention.

FIG. 1b schematically shows a two-dimensional spatial distribution of local radio performance 122 of the radio access network 120 over the vehicle operation site 100 shown in FIG. 1a. As can be seen from the figure, the radio performance varies over an area of the vehicle operation site 100, i.e. the vehicle operation site 100 comprises regions with a strong radio performance and regions with a weak radio performance. Regions with a stronger radio performance are shaded darker and regions with a weaker radio performance are shaded brighter.

The control unit 110 is configured for controlling the autonomous vehicle 130 and for carrying out the method set forth below. The control unit 110 may be configured by a computer program product which comprises a non-transitory computer readable storage medium storing a program code, the program code being executable by the control unit 110 for controlling an autonomous vehicle 130 and causing the control unit 110 to carry out the following method when being executed by a processor of the control unit 110.

The stationary control unit 110 controls the autonomous vehicles 130 via the wireless connections 131 of the autonomous vehicle 130 to the radio access network 120. The autonomous vehicles 130 move in the predefined path network 140. The radio access network 120 allocates spectral resources to the wireless connections 131 while the autonomous vehicles 130 are moving.

The control unit 110 determines a path 132 of the autonomous vehicles 130 in the predefined path network 140 depending on the spectral resources used by the wireless connections 131 of the autonomous vehicles 130 while moving along the determined paths 132. Determining the paths 132 may comprise minimizing an amount of used spectral resources. Therefore, the annealer 160 minimizes a target function indicating the amount of used spectral resources upon request of the control unit 110. The control unit 110 repeatedly transmits a minimization request to the annealer 160 and receives a minimum of the target function from the annealer 160.

Minimizing the amount of used spectral resources comprises determining a plurality of alternative paths 132 for the autonomous vehicle 130 and selecting the path 132 with the minimal amount of used spectral resources from the determined alternative paths 132.

Figure 2:
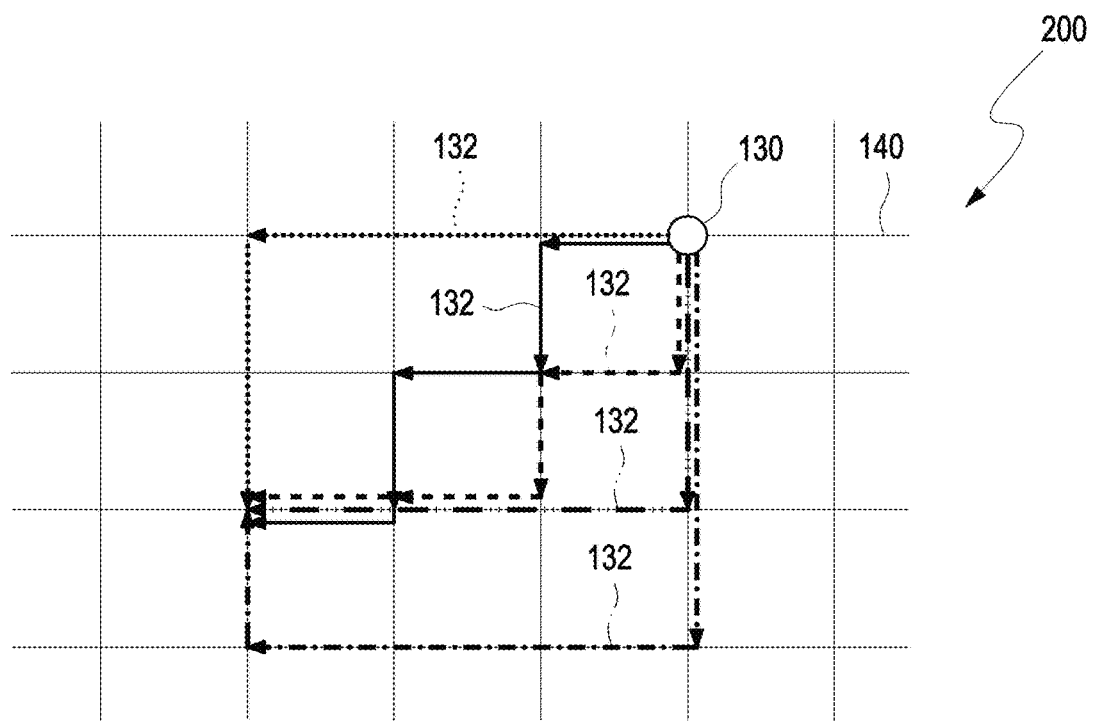

FIG. 2 schematically shows a graph 200 with a plurality of alternative paths 132 on the vehicle operation site 100 shown in FIG. 1a. Each alternative path 132 of the vehicle 130 comprises a plurality of path sections of the path network 140 of the vehicle operation site 100. As can be seen from the figure, the paths 132 have different numbers of path sections, e.g. 5 or 7 path sections.

Each path 132 may be determined by defining a waypoint 134 to be visited by the autonomous vehicle 130 when moving on the path 132 wherein particularly the waypoint 134 is defined randomly.

Figure 3:
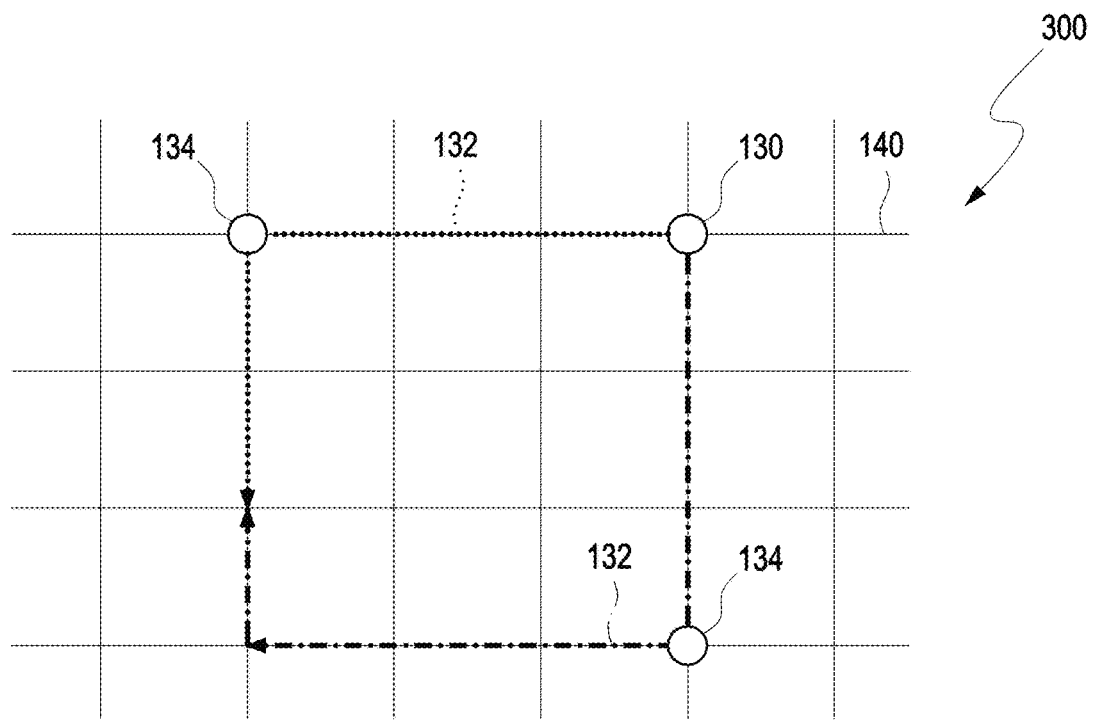

FIG. 3 schematically shows a graph 300 with waypoints 134 defining two alternative paths 132 on the vehicle operation site 100 shown in FIG. 1a. The two different waypoints 134 are selected at equal distances from the autonomous vehicle 130 and define alternative paths 132 having different numbers of path sections. The alternative paths 132 may be determined via the Dijkstra algorithm.

The control unit 110 may also control the devices 150 being different from the autonomous vehicles 130 via the wireless connections 131 of the devices 150 to the radio access network 120. The radio access network 120 allocates spectral resources to the wireless connections 131 of the devices 150. The path 132 of the autonomous vehicle 130 is determined by minimizing an amount of the spectral resources depending on the spectral resources used by the wireless connections 131 of both the vehicles 130 while moving along the determined paths 132 and the devices 150.

The radio access network 120 allocates spectral resources depending on local radio performance of the radio access network 120 along the paths 132.

Preferably, a minimum data rate for uplink and downlink, respectively, and/or a maximum latency for uplink and downlink, respectively, and/or a predefined combination of a minimum data rate and a maximum latency for uplink and downlink, respectively, is assigned to the wireless connection 131 as a parameter of a service quality required by the autonomous vehicles 130. The control unit 110 preferably assigns a corresponding radio performance value 410 to each section 141 of the path 132.

Figure 4:
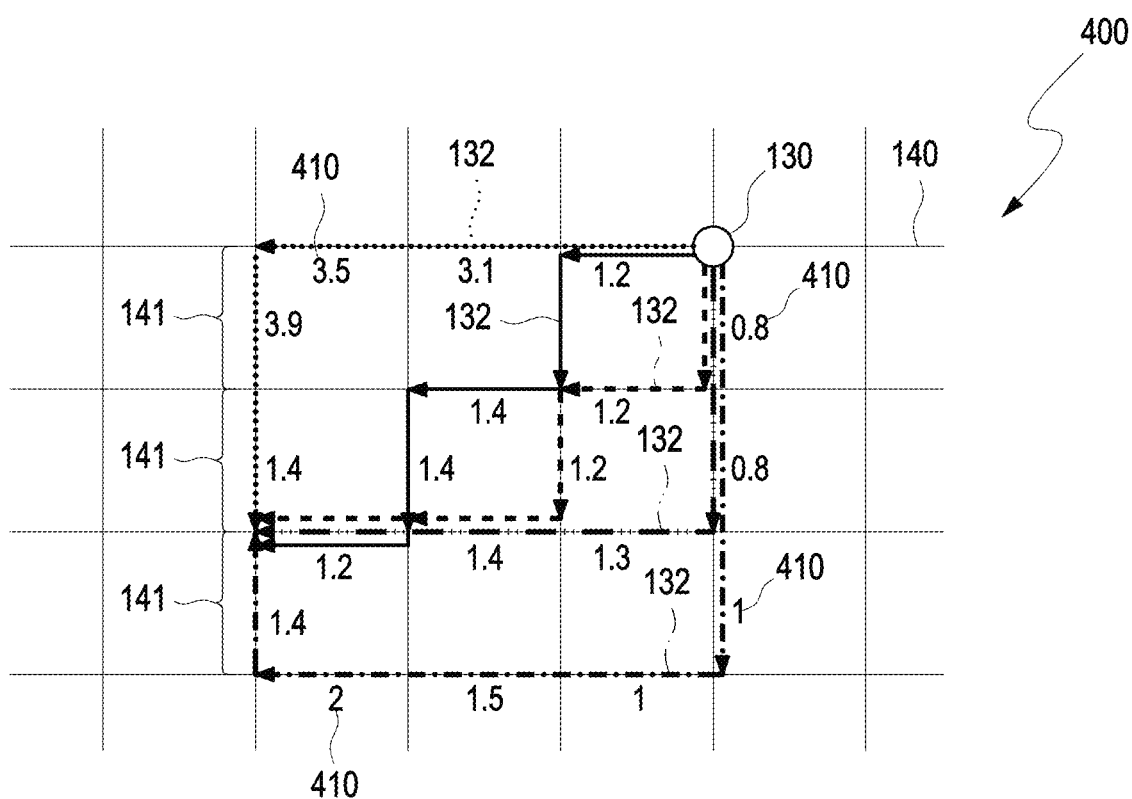

FIG. 4 schematically shows a plurality of radio performance values 410 of the radio access network 120 on the vehicle operation site 100 shown in FIG. 1a. The performance values 410 are the lower the stronger the radio performance is. As can be seen from the figure, a longer path 132 may benefit from a stronger radio performance, i.e. have lower radio performance value values, while a shorter path 132 may suffer from a weaker radio performance, i.e. have higher radio performance values.

A chronological order of the sections 141 of the path 132 may be taken into account by deploying a plurality of time slices. A section 141 of a subsequent path 136 of the autonomous vehicle 130 is preferably taken into account at a time slice when the autonomous vehicle 130 has arrived at a target point 135 of the path 132 before the last time slice.

Figure 5:
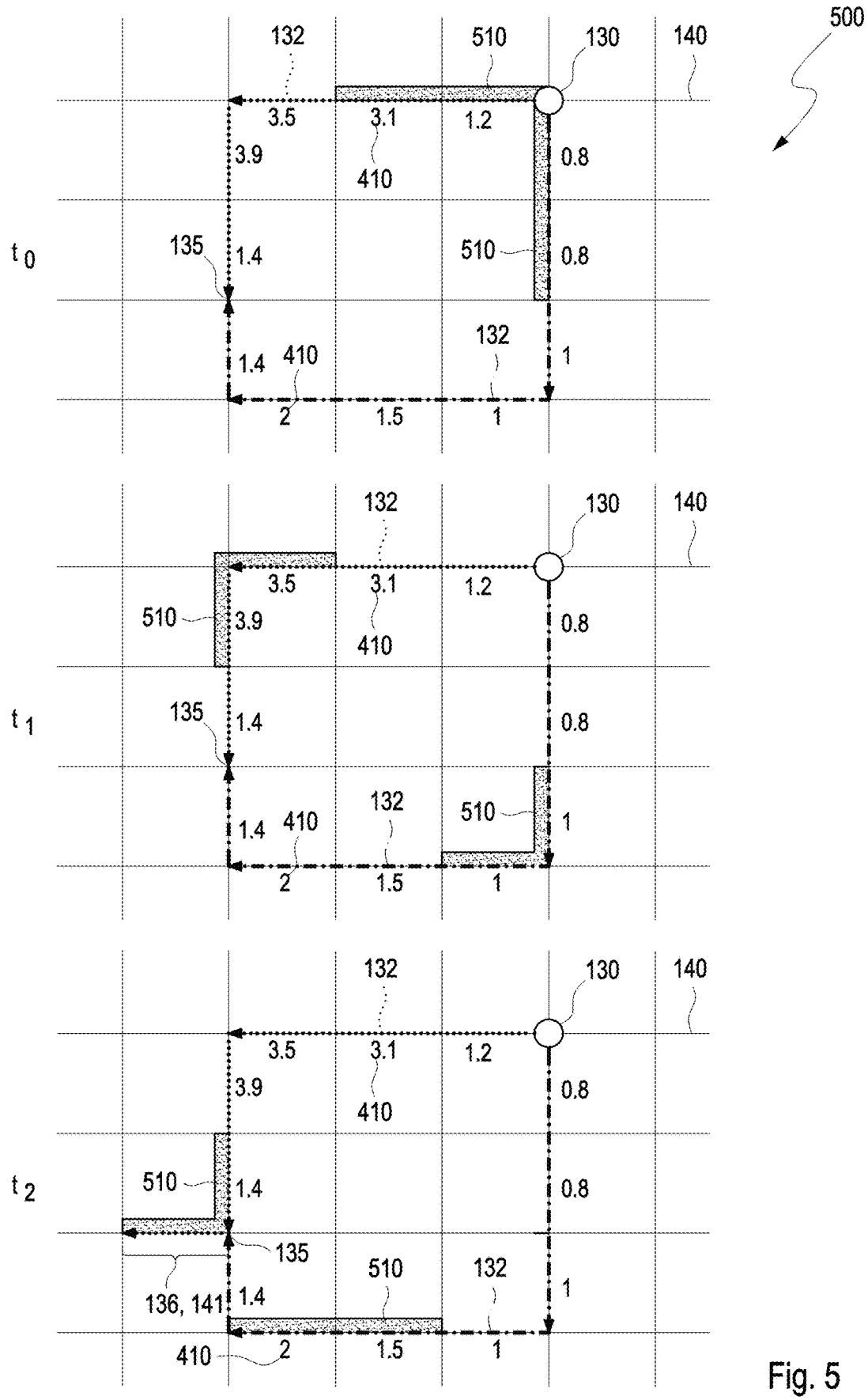
FIG. 5 schematically shows sections of the alternative paths shown in FIG. 3, the sections being associated with subsequent time slices.

FIG. 5 schematically shows partial paths 510 of the alternative paths 132 shown in FIG. 3, the partial paths 510 being associated with subsequent time slices. The time slices have respective starting times $t_0$, $t_1$, $t_2$. Each partial path 510 exemplarily comprises two path sections 141. As can be seen from the figure, at time slice $t_2$ the longer path 132 has not yet reached the target point 135 while the shorter path 132 has already reached the target point 135 and allows for taking into account a section 141 of a subsequent path 136.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 100 vehicle operation site
110 control unit
120 radio access network
121 access node
122 two-dimensional spatial distribution of local radio performance
130 autonomous vehicle
131 wireless connection
132 path
133 starting point
134 waypoint
135 target point
136 subsequent path
140 path network
141 section
150 device
160 annealer
200 graph
300 graph
400 graph
410 radio performance value
500 graph
510 partial path

The invention claimed is:

1. A method, comprising:
controlling, by a stationary control unit connected to a radio access network, an autonomous vehicle via a wireless connection of the autonomous vehicle to the radio access network, wherein the autonomous vehicle moves in a predefined path network;
allocating, by the radio access network, spectral resources to the wireless connection of the autonomous vehicle while the autonomous vehicle is moving; and
determining, by the stationary control unit, a path in the predefined path network to be used by the autonomous vehicle depending on spectral resources to be used by the wireless connection of the autonomous vehicle while moving along the determined path;
wherein determining the path in the predefined path network to be used by the autonomous vehicle comprises:
determining a plurality of paths in the predefined path network for the autonomous vehicle; and
selecting the path associated with a lowest amount of spectral resource usage out of the plurality of paths as the determined path to be used by the autonomous vehicle.

2. The method according to claim 1, wherein each path of the plurality of paths is determined by defining at least one respective waypoint to be visited by the autonomous vehicle.

3. The method according to claim 2, wherein the at least one respective waypoint for each path of the plurality of paths is defined randomly.

4. The method according to claim 1, wherein determining the path in the predefined path network to be used by the autonomous vehicle further depends on spectral resources to be used by at least one other wireless connection of at least one other device.

5. The method according to claim 1, wherein allocating the spectral resources to the wireless connection of the autonomous vehicle while the autonomous vehicle is moving depends on local radio performance of the radio access network, and the stationary control unit assigns respective radio performance values to respective sections of the path.

6. The method according to claim 5, wherein the respective sections of the path correspond to respective time slices.

7. The method according to claim 6, further comprising: based on the autonomous vehicle having arrived at a target point of the path, determining a subsequent path of the autonomous vehicle.

8. The method according to claim 1, wherein a minimum data rate for uplink and downlink, respectively, and/or a maximum latency for uplink and downlink, respectively, and/or a predefined combination of a minimum data rate and a maximum latency for uplink and downlink, respectively, is assigned to the wireless connection as a parameter of a service quality required by the autonomous vehicle.

9. The method according to claim 1, wherein the autonomous vehicle is an industrial truck, an industrial robot, a transport vehicle of a harbor, a railway station or an airport, an agricultural machine, a drone or a car.

10. The method according to claim 1, wherein the stationary control unit controls a plurality of autonomous vehicles, including the autonomous vehicle, and determines respective paths for each autonomous vehicle of the plurality of autonomous vehicles depending on spectral resources to be used by respective wireless connections of the plurality of autonomous vehicles while moving along the respective paths.

11. A stationary control device, comprising:
a processor; and
a non-transitory memory having processor-executable instructions stored thereon;
wherein the processor is configured to execute the processor-executable instructions to facilitate:
controlling, by the stationary control device, an autonomous vehicle via a wireless connection of the autonomous vehicle to a radio access network, wherein the autonomous vehicle moves in a predefined path network, and wherein the radio access network allocates spectral resources to the wireless connection of the autonomous vehicle while the autonomous vehicle is moving; and
determining, by the stationary control device, a path in the predefined path network to be used by the autonomous vehicle depending on spectral resources to be used by the wireless connection of the autonomous vehicle while moving along the determined path;
wherein determining the path in the predefined path network to be used by the autonomous vehicle comprises:
determining a plurality of paths in the predefined path network for the autonomous vehicle; and
selecting the path associated with a lowest amount of spectral resource usage out of the plurality of paths as the determined path to be used by the autonomous vehicle.

12. A non-transitory computer-readable medium having processor-executable instructions stored thereon, wherein the processor-executable instructions, when executed, facilitate:
controlling, by a stationary control device, an autonomous vehicle via a wireless connection of the autonomous vehicle to a radio access network, wherein the autonomous vehicle moves in a predefined path network, and wherein the radio access network allocates spectral resources to the wireless connection of the autonomous vehicle while the autonomous vehicle is moving; and
determining, by the stationary control device, a path in the predefined path network to be used by the autonomous vehicle depending on spectral resources to be used by the wireless connection of the autonomous vehicle while moving along the determined path;
wherein determining the path in the predefined path network to be used by the autonomous vehicle comprises:
determining a plurality of paths in the predefined path network for the autonomous vehicle; and
selecting the path associated with a lowest amount of spectral resource usage out of the plurality of paths as the determined path to be used by the autonomous vehicle.

* * * * *